July 2, 1968     SHINGO INOUYE     3,391,239
ELECTRODE CENTERING MECHANISM FOR VACUUM ARC MELTING
Filed May 6, 1966     4 Sheets-Sheet 3
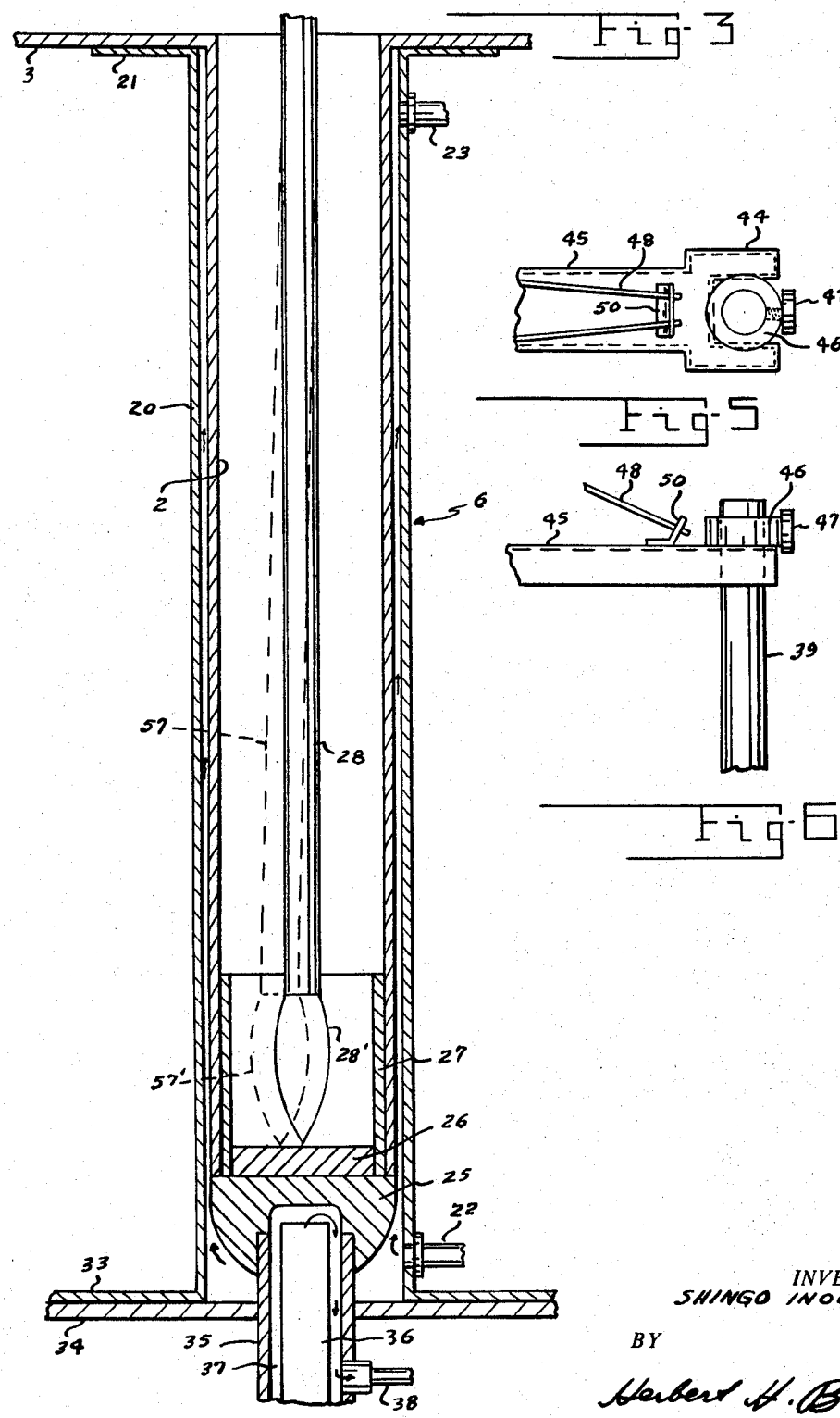
INVENTOR.
SHINGO INOUYE
BY
Herbert H. Brown
ATTORNEYS

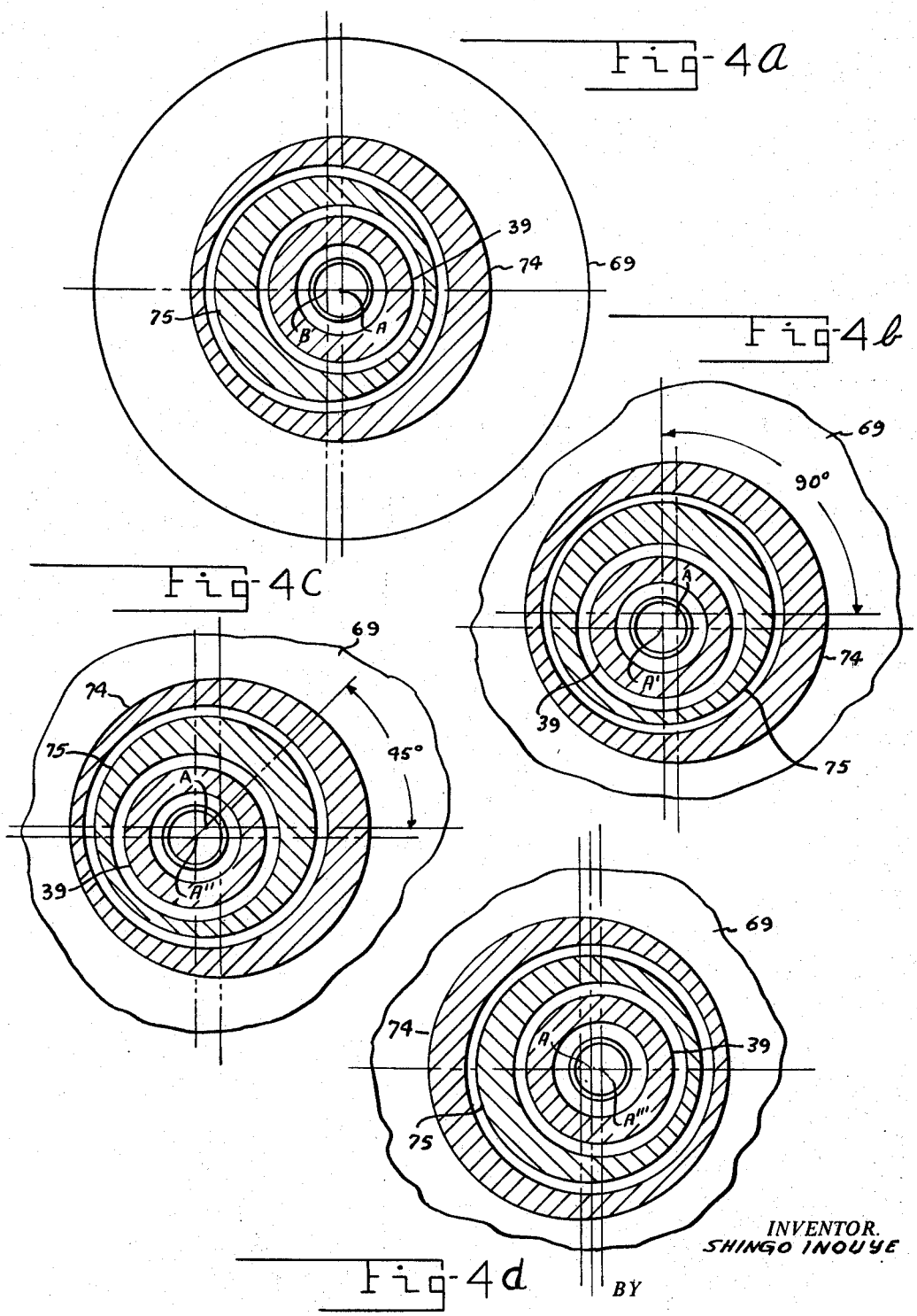

United States Patent Office 3,391,239
Patented July 2, 1968

3,391,239
ELECTRODE CENTERING MECHANISM FOR VACUUM ARC MELTING
Shingo Inouye, Dayton, Ohio, assignor to the United States of America as represented by the Secretary of the Air Force
Filed May 6, 1966, Ser. No. 548,328
5 Claims. (Cl. 13—14)

ABSTRACT OF THE DISCLOSURE

Apparatus for maintaining the central position of a metal rod being presented to a melting arc to obtain a pure ingot. The centering apparatus includes a pair of sleeve-like cams, surrounding the rod, one sleeve within the other, and having an eccentric relation with respect to one another such that any turning effect of either sleeve will cause the encompassed end of the rod to move in a transverse direction. A corresponding movement of the active end of the rod electrode producing the arc is thus obtained as to maintain the proper arcing position notwithstanding any lack of being rectilinear throughout its length.

---

The invention described herein may be manufactured and used by or for the United States Government for governmental purposes without the payment to me of any royalty thereon.

The present invention relates to arc melting processes and apparatus therefor, more particularly for the procurement of ingots from sintered electrodes by the use of a melting arc.

In many uses of refractory metals, both commercial and laboratory, it is required that the material should be absolutely free from impurities. Tungsten, for example, in a pure state is usually supplied as an ingot obtained by a melting process in vacuo. The raw material, as furnished by the original manufacturer, is generally in the form of a rod of sintered tungsten. The rod is employed as an electrode of an arc furnace maintained under a high vacuum, and presented to a mold or crucible which collects the melted metal as it drips from the electrode. The ingot can be removed from the mold and represents tungsten in a pure state for subsequent processing.

These rods of sintered metal are often several feet long, possibly 1½" in diameter, and are generally not rectilinear, nor perfectly round. As a result, when the rod is being melted by the arc and is continuously fed downwardly to maintain a constant arcing distance from the mold, it has been found that the end of the rod may not remain in alignment with the mold. In an extreme case, the active portion of the rod, may move considerably out of line and cause "burn through" of the mold, or at least will greatly impair homogeneity of the ingot.

An object of the invention is to provide an improved structure by which the active end of a metal electrode in an arc furnace will be maintained in alignment with respect to the mold, withstanding irregularities in the size and shape of the electrode.

Another object is to provide improved structure in a vacuum arc furnace by which a sintered impure rod of metal can be continuously fed to the melting action of an arc and maintained in alignment with the mold during the melting process without breaking the vacuum.

These objects are obtained in brief by embracing the upper end of the electrode within a pair of annular sleeves or cam elements, one within the other and having an eccentric relation with respect to one another such that any turning effect of either sleeve or cam will cause the encompassed end of the electrode to move in a transverse direction. This movement, which would be controlled exterior of the furnace, i.e., away from the position of the arc, will cause a corresponding movement of the active end of the electrode producing the arc in such direction as to maintain the proper arcing position.

The invention will be better understood when reference is made to the following description and accompanying drawings, in which:

FIG. 3 shows the lower or active portion of the furnace, also enlarged, and the manner in which the lower end of the active electrode can move transversely of the mold and thus lend itself to adjustment;

FIGS. 4a, 4b, 4c and 4d are transverse cross sections broken away in part and taken at about the line 4—4 in FIG. 2. These figures show the relative movement of the upper portion of the electrode as the improved adjusting sleeves or cams are turned through different angles relative to one another;

FIG. 5 is a fragmentary view in plan showing the detail of holding the upper end of the electrode in place; and FIG. 6 is a fragmentary showing of the same detail but in elevation.

Figure 1:
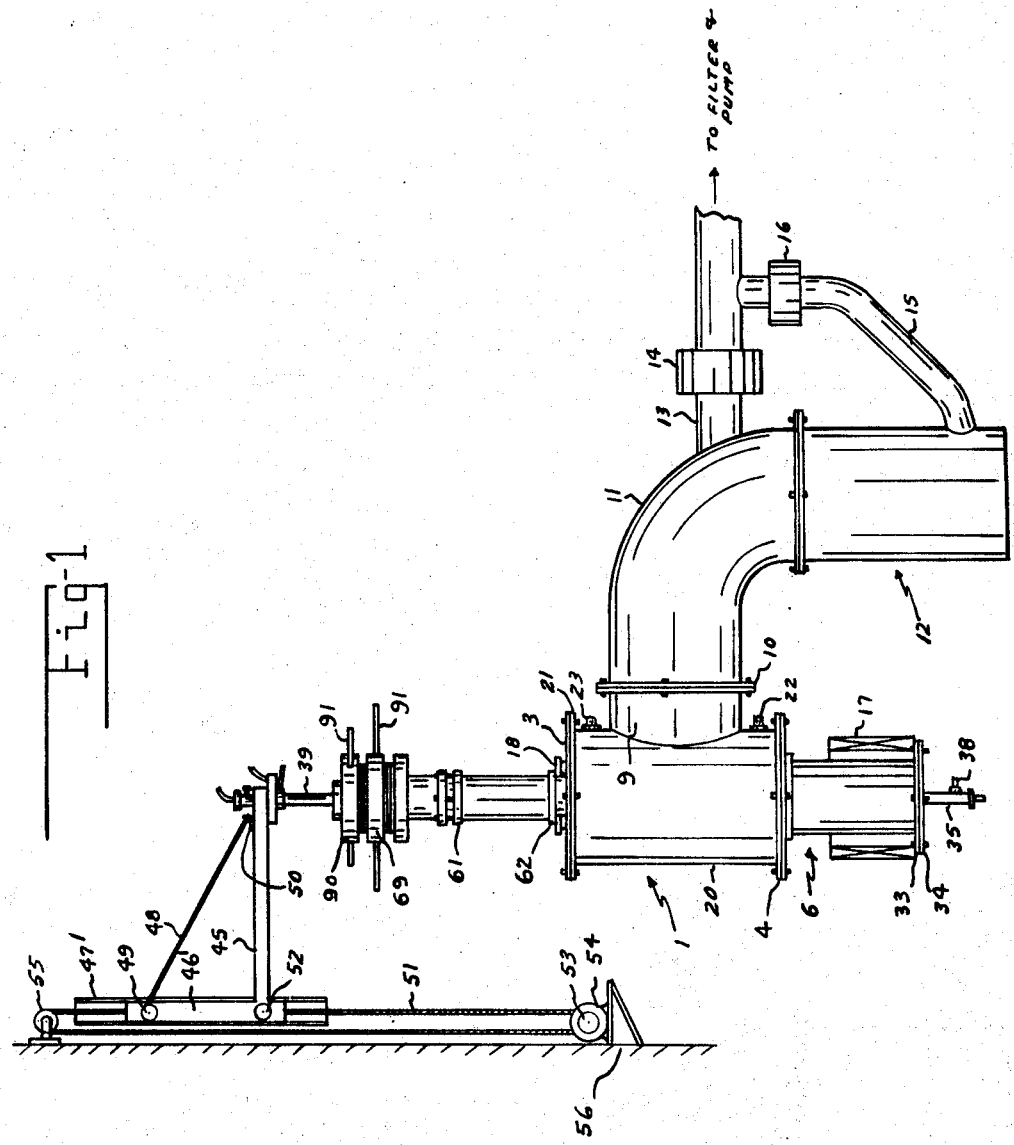
FIG. 1 represents an elevational view of a portion of an electric arc furnace provided with the improved electrode centering structure.

Referring to FIG. 1, an evacuated arc furnace is shown generally at 1. It includes a relatively large cylindrical casing of metal having top and bottom plates 3 and 4. Depending from the latter, there is a combined casing and water jacket structure, indicated generally at 6, which contains the melting arc, also the active end of the rod to be melted. The structure is secured to the plate 4 in any suitable manner.

The main casing is provided with a transversely extending pipe 9 to which is bolted as at 10, an elbow conduit 11 of large size, leading to an oil diffusion pump of any suitable and well-known type, indicated generally at 12. A pipe 13 is taken from the conduit 11 and connected through a valve 14 to a so-called "Dollinger" filter and a large mechanical pump (not shown) of any suitable and well-known type. A pipe 15 is connected between the diffusion pump 12 and a valve 16 leading to the pipe 13. The apparatus to the right of the elbow 11 is of standard construction and is for the purpose of maintaining a fairly good vacuum or relatively low pressure in the casings indicated generally at 1 and 6. The arc takes place within the casing 6 as will be explained hereinafter and by subjecting the electrode 28 and the mold to relatively low voltage and high current, an intense heating effect is set up which causes the long sintered rod to be melted and thereby purified. As the rod melts, the material drips into a mold or crucible to form an ingot. While the metal in the mold is still in a liquid or flowable state, it is kept agitated by means of an electromagnetic coil indicated at 17.

Figure 2:
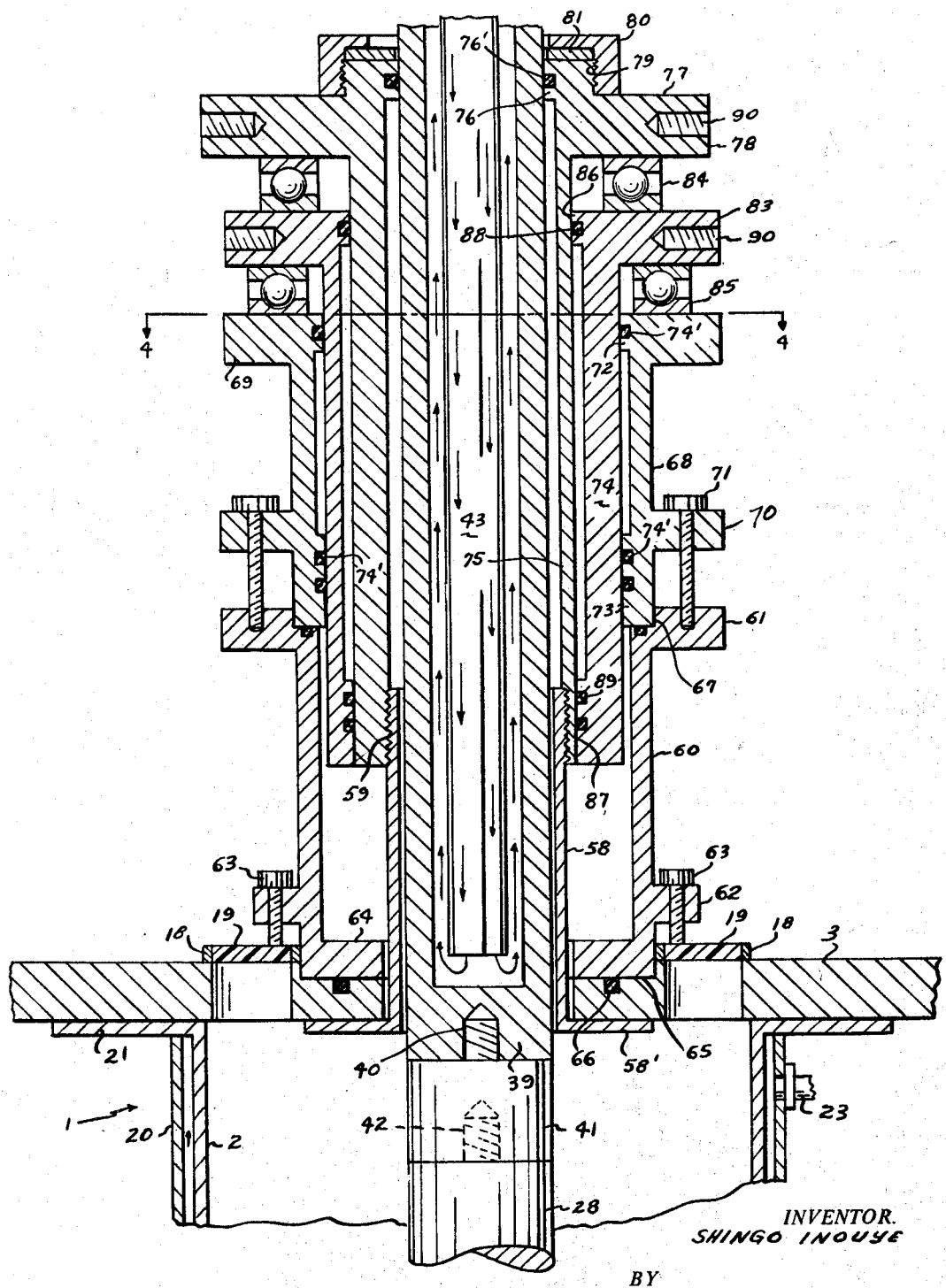
FIG. 2 depicts an enlarged vertical section of the centering device position on top of the furnace.

On top of the plate 3 there is a plurality of peep sights 18 employing openings through the plate which are sealed by highly transparent quartz windows 19 (FIG. 2). The position of the electrode being melted and its position with respect to the mold can be readily observed through these peep sights. The casing 2 (FIG. 3) is surrounded by a water jacket, indicated at 20, which is secured by a flange 21 to the plate 3 in any suitable manner. The jacket has a water inlet 22 (FIG. 3) and an outlet 23.

The casing 6 is actually formed of two cylinderical enclosures, one surrounding the other and spaced a short distance apart as seen in FIG. 3. The inner cylinder 2 carries at its lower end, a hemispherical metal body 25. The flat upper surface of the latter supports a round strike plate 26 of a refractory metal which forms the bottom of the mold or crucible 27. The lower or active end of the sintered rod 28 is presented to the open end of the mold and at the proper distance to support an arc discharge between the rod and the strike plate caused by the app'ied voltage, as is well known in the art. The arc, indicated at 28', gives off intense heat which causes the end of the rod or electrode 28 to melt and drop into the mold. The impurities within the melted metal are driven off by the pumping system so that the deposited metal is in a pure state. The melted mass in the mold is kept agitated by the solenoid 17 so that the ingot, when solidified, represents a pure and homogeneous body of the metal derived from the sintered rod. The latter is continuously fed downwardly by a mechanism described hereinafter in order to maintain the proper arcing distance.

The casing is provide with a water jacket 20 which surrounds the inner cylinder 2 but leaving an annular space to permit the circulation of water entering the inlet 22. The jacket is supported at the top by means of a flange 21 which is secured to the plate 3. The lower end of the jacket terminates in a flange 33 for carrying a plate 34. The latter serves to seal the lower end of the water jacket and also furnishes support for an upright conduit 35 which projects into the lower end of the metal body 25. The conduit contains a pipe 36 for receiving a coolant which can flow up the pipe then over the top as indicated by the arrows into the annular space 37 and out through the pipe 38. The cooling medium controls the temperature of the metal body 25 and the strike plate 26.

It has been explained that the sintered rod 28 is continuously fed downwardly as the arc melts the lower or active end. A typical apparatus for controlling this movement of the electrode is shown in FIGS. 1, 5 and 6. For practical reasons, it has been found preferable not to directly support the upper end of the sintered rod from the continuously descending mechanism but to provide an extension on the rod consisting of a ground shaft 39 of a precise diameter, substantially of the same size as the sintered rod. The shaft has a threaded opening 40 for receiving a threaded projection on an adapter element 41. The latter is provided with a threaded opening 42. The sintered rod 28 is provided with a threaded stub which is adapted to be screwed into the threaded opening of the adapter. On account of the intervening adapter 41, the sintered rod 28 to be melted need not be of a precise diameter, nor strictly rectilinear. But this irregularity of size and shape does not impair its connection to the shaft 39 which is of precise diameter and alignment as long as the threads 40, 42 can be engaged. Moreover, the use of the adapter 41 permits the shaft 39 to be constituted of a less expensive metal than the sintered rod 28. The necessity for the preciseness of dimension of shaft 39 will appear presently. The shaft is hollow to receive a conduit 43 of smaller size than the bore in the shaft so as to leave an annular space through which a cooling fluid can be forced, as indicated by the arrows.

As seen in FIGS. 5 and 6, the upper end of the shaft 39 is supported by the forked ends 44 of a horizontal beam 45 which may be formed of an inverted U-shape member. A collar 46, provided with a set screw 47, may be used to support the shaft from the forked ends of the beam. The latter constitutes part of a right angle frame of which the other part, integrally joined, forms a guide block 46' which can travel vertically along the groove of a U-shape rail 47'. The latter may be affixed to a wall (not shown). Diagonally positioned struts 48 may extend from a stud 49 on the block to an anchor bar (FIG. 1) secured to the beam for strengthening purposes. A sprocket chain 51 can be attached at its upper end to the stud 49 and at its lower end to a stud 52 provided on the block. The chain passes around a sprocket wheel 53 driven by a motor 54 and at its upper end is guided over an idler wheel 55. These wheels and also the driving motor can be supported from the wall 56 in any suitable manner. It is apparent that as the motor turns, the beam 45 is caused to be lowered at a rate determined by the speed of the motor. Inasmuch as the shaft 39 is connected through the adapter 41 to the sintered rod 28, the latter can be continuously lowered to present fresh surfaces to the melting arc. For automatic operation, the voltage across the arc may be employed in a well-known manner to regulate the speed of the motor 54 so as to maintain a constant arcing distance between the active end of the rod 28 and the mold. In order to replenish the rod, it is necessary merely to raise the beam 45 by running the motor in reverse and screwing the new rod into the adapter 41.

It has been found, in practice, that the sintered rod 28, when received from the producer, is usually neither true in diameter nor absolutely rectilinear. Quite often bends are present along the length of the rod. Since the arcing distance is relatively small, any deviation in position of the active end of the rod with respect to the mold can cause considerable impairment of the homogeneity of the melted ingot and also variations in the voltage drop which might adversely affect the motor 54 and the rate of feed. In extreme cases of a bent rod, the active end may approach the sides of the mold as indicated at 57' in FIG. 3 to cause a "burn through" which would ruin the ingot and possibly subject the operating personnel to danger.

However, in accordance with my invention, improved apparatus is provided to maintain a central position of the active end of the rod, regardless of the amount of irregularity of shape of the sintered element. Referring more particularly to FIGS. 2, 4a, 4b, 4c, and 4d, there is upstanding from the top plate 3 a cylindrical member 58 which has a bore only slightly larger than the shaft 39. The lower end of the member is provided with an outwardly extending flange 58' which slidably contacts the underside of the plate. The upper end of the member 58 terminates at the exterior in a threaded portion 59, the purpose of which will be explained presently. The plate 3 also carries a relatively large cylindrical housing 60 which has an outwardly extending flange 61 at the upper end and a similar flange 62, but of smaller diameter, near the lower end of the housing. A number of equidistantly spaced cap screws 63 pass through the flange 62 and are threaded into the plate 3. The bottom of the housing has an inwardly extending flange or foot member 64 which bears lightly against the shaft 39 and sets in a countersunk recess 65 in the plate. An O-ring seal 66 is provided in a groove in the recessed surface.

The upper end of the housing 60 has a countersunk recess 67 for receiving the lower end of a second cylindrical housing 68. The latter is provided at the top with an outwardly extending flange 69 and a similar flange 70 at a position near the lower end of the housing. A plurality of cap screws 71 pass through the flange 70 and are screwed into the flange 61, rigidly to hold the housings 68 and 60 together. The latter therefore have a fixed position with respect to the top plate 3 of the arc furnace. The upper housing has an undercut inner diametral surface leaving upper and lower inwardly extending portions 72, 73 which bear against the exterior surface of a so-called "outer" cam member or sleeve 74 which will be described presently.

Sealing rings 74' may be provided in the portions 72, 73. The threaded portion 59 of the member 58 receives the threaded end of a so-called "inner" cam member or sleeve 75 which will also be described in detail. This member has an inwardly projecting lip 76 at the top which bears against the shaft 39. An O-ring 76' can be contained within a groove in the said lip. The inner cam member, at the top, is provided with a shouldered surface 77 which forms an outwardly extending flange 78.

The upper end of the cam member 75 is provided with a neck portion which is threaded at 79 to receive a flanged nut 80 bearing against a flexible washer 81. It is evident that upon tightening the nut, all of the apparatus located between the nut and the flange 58' can be held firmly in longitudinal position.

The outer cam member or sleeve 74 is provided at its upper end with an outwardly extending flange 83 which is separated from the flange 78 by a ball bearing ring 84. The latter is adapted to move when necessary transversely of the space between the two flanged members. The lower surface of the flange 83 is supported on the upper surface of the flange 69 by a ball bearing ring 85 and the latter, as in the case of the upper ball bearing, is adapted to move sidewise when necessary. Thus, the inner and outer cam members 75, 74 are able to turn with respect to the housings 68, 60. The outer cam 74 is provided with inwardly extending annular lips 86, 87 which bear against the outer periphery of the inner cam 75. These portions have grooves 88, 89 for receiving O-rings. Each of the flanges 78, 83 of the respective cams are provided with a plurality of radially directed openings 90, preferably 90° apart, which are threaded to receive the threaded ends of rods 91 (FIG. 1) which serve as handles for turning the cam members.

It has been pointed out that the lower end of cam 75 is threadably engaged to the sleeve member 58 having a flange 58' at its lower end. Consequently, when the cam 75 is turned, the flange 58' is adapted to slide about the lower face of the plate 3 and also can turn with respect to the cam 74 on account of the ball bearings 84. However, both cams 74 and 75 are adapted to be turned within the stationary housings 68, 60 because the ball bearings 84, 85 are permitted to slip at the flange 69.

Referring to FIG. 4a, the large full circle represents the outside periphery of the flange 69, forming part of the housing 68 which is bolted and therefore in fixed position with respect to the furnace. The center of this circle is indicated at A and represents the central position of the shaft 39 which carries the meltable electrode 28. However, it will be noted that the outer surface of the cam 74 has a circular periphery with A as the center. But the inner periphery, also circular, has a center at the point marked B so that this inner periphery is eccentric with respect to the outer periphery of the cam. The outer circular periphery of the inner cam 75 has its center also at the point B while the inner circular periphery of this cam has its center at the point A. Thus, in FIG. 4a, the eccentricity of one cam offsets the equal and opposite eccentricity of the other cam to leave the shaft 39 on almost the same center as the center of the fixed housing 68 when the two cams occupy the positions as shown in this figure.

However, when the inner cam 75 is moved clockwise by grasping the set of handles at 91 (FIG. 1), through 90°, as indicated in FIG. 4b, the center of the shaft is moved from its initial position A to a new position A'. FIG. 4c shows how the center moves diagonally downward and to the left, to the new position A" when the inner cam is moved to a position indicated by the 45° angle. FIG. 4d indicates that the center of the shaft moves to the position A''', sidewise and to the right, from the original position A when the outer cam 74 is turned 180° with respect to the stationary inner cam 75. Thus by moving one cam with respect to the other cam, or vice versa, the center of the shaft can be caused to move in any direction radiating from the original center thereby providing a universal transverse movement. This movement of the center is facilitated by the presence of the ball bearing sets 84, 85 and the fact that the flange 58' is permitted to slide along the underside of the plate 3.

Accordingly, the operator merely mounts the top of plate 3 periodically and looks through the peep sights 19 to observe the position of the active end of the sintered rod 28 with respect to the mold. If it is found, that due to irregularities of the shape of the rod as it is being continuously fed, that it tends to veer to the right or left of the center of the mold, as indicated at 57' in FIG. 3, it is merely necessary to turn one or both cams in the proper direction and amount to bring the rod back to the center position and thus avoid any burn through of the mold or any other irregularity in forming the ingot.

It will be noted that as the flange 58' moves along the underside of the plate 3 when the cams are being operated, the flange tends to offer a pseudo-fulcrum effect for the shaft 39 so that a small sidewise movement at the top of the shaft, brought about by the turning of the cams, will produce a somewhat greater movement at the active end of the sintered rod 28 across the mold. Thus, very little adjustment need be made by the cams. It will be further noted that the movement of rod 28 can be accomplished without disturbing the seals since all of the cam movement is in a rotary direction, and the seals adequately protect the relatively low pressure in the furnace.

While I have shown and described two housings 60 and 68 connected together at the cap screws 71, it is apparent that if the sintered rod 28 is of relatively short length, the upper one of these housings can be dispensed with, in which case the ball bearings 85 will be effective between the flange 61 and the flange 83. The two housings 60, 68 are desirable mainly in the event of a long sintered rod 28 which would place the cams 74, 75 at a considerable distance above the plate 3.

It is also evident that a rod of any metal which can be melted by means of low pressure arc melting can be employed in place of the sintered rod of 28. However, the latter is quite often composed of sintered tungsten. Other refractory metals which may or may not be sintered, but are in an impure state, and it is desired to render them into pure ingot form, can also be employed.

While a certain specific embodiment has been described, it is obvious that numerous changes may be made without departing from the general principle and scope of the invention.

I claim:

1. In an arc furnace of the evacuated type for melting metal in the form of an electrode, a portion of the electrode being positioned exterior of the furnace and a fusible portion within the furnace in arcing position with respect to a mold which receives the melted material, means surrounding the exterior electrode portion for moving the fusible portion within the furnace in a transverse direction across the mold to maintain a central position thereof notwithstanding irregularities in the linearity of said fusible electrode portion, said means surrounding the electrode portion is constituted of a pair of circular cams, one surrounding the other within a circular housing secured to the furnace, the exterior surface of the inner cam and the inside surface of the outer cam having the same center which is located eccentric with respect to the center of the housing, the inside surface of the inner cam bearing against said electrode portion and the outside surface of the outer cam bearing against the housing, said last-mentioned inside surface and outside surface having a center which coincides with the center of the housing whereby when one cam is turned with respect to the other cam, the eccentricity effects of the exterior surface of the inner cam and the inside surface of the outer cam cause the exterior electrode portion to move in a transverse direction and this movement is communicated through said electrode portion to the fusible electrode portion within the furnace.

2. An arc furnace for melting metal according to claim 1 in which the eccentric effect of one cam is equal and opposite to the eccentric effect of the other cam for a predetermined relative position of the cams whereby the exterior electrode portion can be positioned centrally of the housing but when the cams are moved relative to one another away from said predetermined position, the eccentricity effects cause the center point of the inner cam to move away from the center point of the housing, thereby forcing the contained electrode portion to a new position in a transervse direction in order to restore the fusible electrode portion within the furnace to its central position with respect to the mold.

3. In an arc furnace for melting metal in the form of a rod, presented to a mold within an evacuated space, said rod extending to the exterior of the furnace, a peep sight in the furnace for observing the position of the active end of the rod with respect to the mold, and means including a multi-part cam structure in contact with the extended part of the rod for moving said part with respect to the furnace and thereby moving the active part of the rod to its optimum position with respect to the mold according to the visual determinations made through the peep sight, said multi-part cam structure being constituted of at least an inner and an outer annular cam, one surrounding the other, and having the exterior part of the rod contained within the opening of the inner cam, the peripheries of the openings of the cams having different centers from the centers of their respective outside peripheries, a fixed circular housing immediately surrounding the outer cam whereby when either cam is turned within the housing with respect to the other cam, the eccentricity effect of the different cam centers causes the contained exterior electrode portion to move in the transverse direction to a new position depending upon the direction and amount of the turning effort whereby this change in position of the said electrode portion causes the fusible electrode portion within the furnace to move in a corresponding manner with respect to the mold, in order continuously to maintain a central position of the fusible electrode portion with respect to the mold.

4. In an arc furnace for melting metal in the form of an electrode, a portion of said electrode being constituted of a shaft positioned exterior of the furnace and another portion being presented to a mold within the furnace, means for maintaining said presented portion of the electrode at the central position of the mold, said means including a pair of circular sleeves of different outside diameter and having circular openings of different diameters such that one sleeve can be positioned within the other, a cylindrical housing secured to the furnace in the region of said exteriorly positioned electrode portion, the outer surface of the outer sleeve being positioned concentrically within said housing, the opening in the outer sleeve and the outer surface of the inner sleeve being eccentric with respect to said housing, the opening in the inner sleeve being concentric with respect to the housing and bearing against said exterior portion of the shaft, the degree of eccentricity of the opening in the outer sleeve being of the same order as the eccentricity of the outer surface of the inner sleeve whereby in one predetermined position between the sleeves, the exterior position of the inner sleeve can be positioned concentric with said housing to provide a central position of the shaft but when the interior portion of the electrode lacks rectilinearity on its downward movement toward the mold, the eccentricity derived from the sleeves, upon relative rotation, can be employed to shift the exterior portion of the electrode to an off-center position as will counteract the tendency of the presented portion of the electrode to move away from the center of the mold on account of said lack of rectilinearity.

5. An arc furnace according to claim 4 in which each of the inner and outer sleeves are provided with outwardly extending flanges, one above the other and a ball-bearing structure positioned between the flanges, said housing being also provided with an outwardly extending flange parallel to the first-mentioned flanges, and separated therefrom by a ball-bearing structure, and hand bars extending radially outward from the first-mentioned flanges in order to facilitate relative movement between the rotatable sleeves with respect to one another and with respect to said housing.

References Cited
UNITED STATES PATENTS

| 1,889,907 | 12/1932 | Terry | 13—9 |
| 3,300,618 | 1/1967 | Sciaky | 219—121 |
| 3,291,959 | 12/1966 | Schleich et al. | 219—121 |

BERNARD A. GILHEANY, *Primary Examiner.*

H. B. GILSON, *Assistant Examiner.*